US008761592B2

(12) United States Patent
Ohara et al.

(10) Patent No.: US 8,761,592 B2
(45) Date of Patent: Jun. 24, 2014

(54) INTERCHANGEABLE LENS, CAMERA, AND CAMERA SYSTEM

(71) Applicant: Canon Kabushiki Kaisha, Tokyo (JP)

(72) Inventors: Toru Ohara, Utsunomiya (JP); Minoru Uchiyama, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/892,007

(22) Filed: May 10, 2013

(65) Prior Publication Data

US 2013/0308931 A1 Nov. 21, 2013

(30) Foreign Application Priority Data

May 15, 2012 (JP) ................................. 2012-111886

(51) Int. Cl.
*G03B 13/36* (2006.01)
(52) U.S. Cl.
USPC ............................................................ 396/81
(58) Field of Classification Search
CPC ....................................................... G02B 7/282
USPC ................................................... 396/79–83
See application file for complete search history.

(56) References Cited

U.S. PATENT DOCUMENTS

| 5,946,504 A * | 8/1999 | Hirasawa et al. | 396/80 |
| 2002/0191973 A1 | 12/2002 | Hofer | |
| 2005/0254143 A1 | 11/2005 | Saito | |
| 2010/0232775 A1 | 9/2010 | Okamoto | |
| 2011/0292272 A1 | 12/2011 | Terashima | |
| 2013/0308931 A1* | 11/2013 | Ohara et al. | 396/81 |

FOREIGN PATENT DOCUMENTS

| EP | 2615823 A2 | 7/2013 |
| JP | 2008-197582 A | 8/2008 |
| JP | 2009-258308 A | 11/2009 |
| JP | 2010-271696 A | 12/2010 |
| WO | 2007-000946 A1 | 1/2007 |
| WO | 2007-055281 A1 | 5/2007 |

* cited by examiner

*Primary Examiner* — W B Perkey
(74) *Attorney, Agent, or Firm* — Canon U.S.A., Inc. IP Division

(57) ABSTRACT

An interchangeable lens detachable from a camera includes a variator lens configured to change a focal length by moving in an optical axis direction, a focus lens configured to change a focusing state of an object image by moving in the optical axis direction, a diaphragm configured to adjust an amount of light, an acquisition unit configured to acquire an amount of change in image magnification corresponding to information about a position of the variator lens, a position of the focus lens, and an aperture value of the diaphragm, and a lens control unit configured to transmit the amount of change in image magnification to the camera.

18 Claims, 6 Drawing Sheets

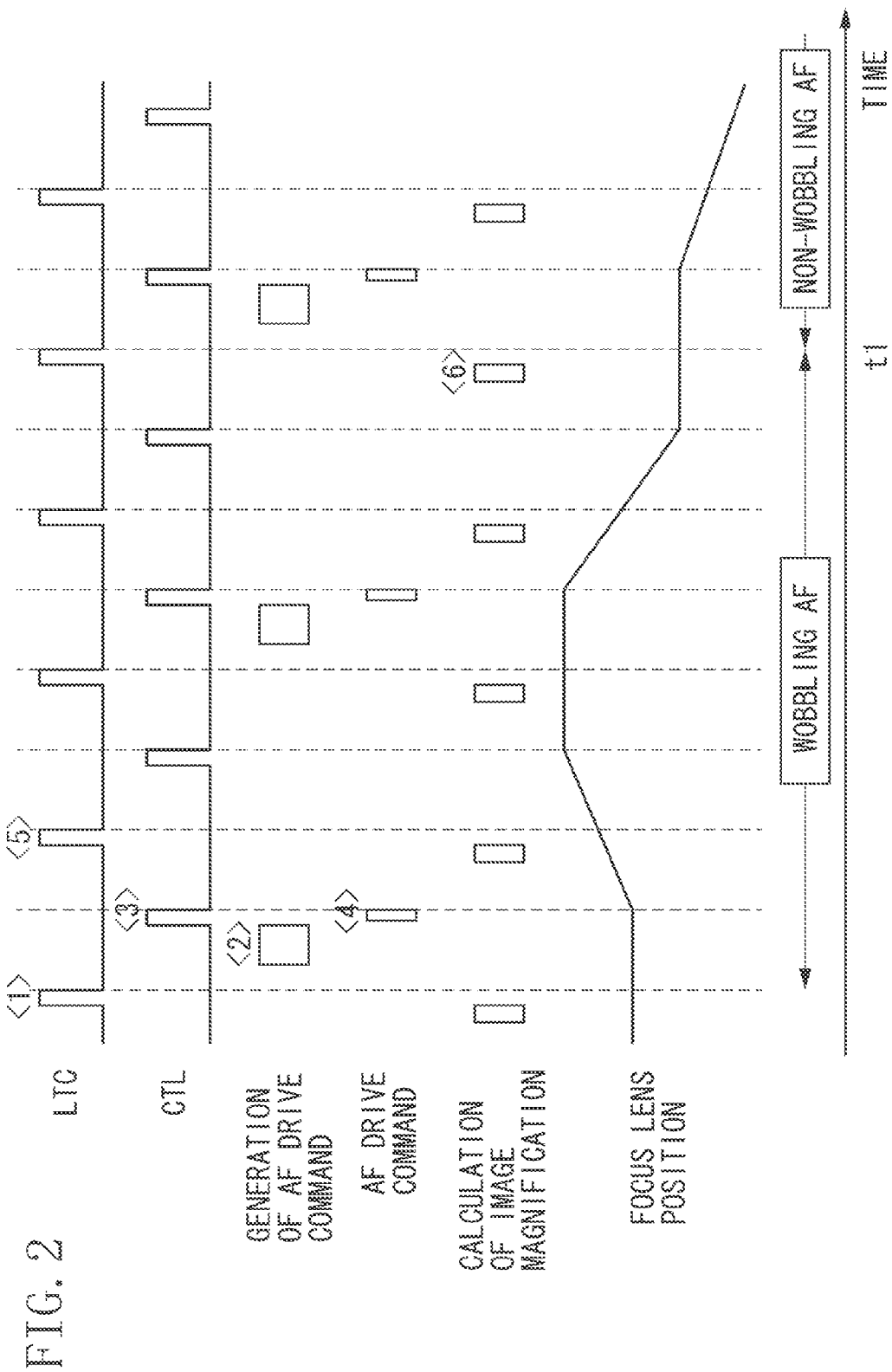

INTERCHANGEABLE LENS, CAMERA, AND CAMERA SYSTEM

BACKGROUND OF THE INVENTION

1. Field of the Invention

The present invention relates to an interchangeable lens, a camera, and a camera system.

2. Description of the Related Art

Until now, there has been a contrast automatic focusing (AF) method, as an automatic focusing method used in capturing a moving image, in which a focus lens is wobbled to be lead to an in-focus position while determining a focusing state from a captured image signal. If a lens with high optical sensitivity such as the focus lens is moved, it has been also known that the movement causes a change in image magnification depending on conditions for a focal length and an F-number. For this reason, there is a possibility that the focus lens is wobbled to make the change in image magnification conspicuous.

As a countermeasure of this, Japanese Patent Application Laid-Open No. 2010-271696 discusses a technique, in which association information is stored that information about the position of a variator lens is associated with information about a rate of a change in image magnification caused in performing wobbling control on the focus lens, and the wobbling control is changed based on the information. The association information is transmitted from an interchangeable lens to a camera body in an initial communication when the interchangeable lens is mounted on the camera body, so that it takes a long time for the initial communication.

SUMMARY OF THE INVENTION

The present invention is directed to an interchangeable lens, a camera, and a camera system in which information is efficiently transferred between an interchangeable lens and a camera body with respect to change in image magnification caused by the movement of a focus lens to decrease the time required for initial communication.

According to an aspect of the present invention, an interchangeable lens detachable from a camera includes a variator lens configured to change a focal length by moving in an optical axis direction, a focus lens configured to change a focusing state of an object image by moving in the optical axis direction, a diaphragm configured to adjust an amount of light, an acquisition unit configured to acquire an amount of change in image magnification corresponding to information about a position of the variator lens, a position of the focus lens, and an aperture value of the diaphragm, and a lens control unit configured to transmit the amount of change in image magnification to the camera.

According to another aspect of the present invention, a single-focus interchangeable lens detachable from a camera includes a focus lens configured to change a focusing state of an object image by moving in the optical axis direction, a diaphragm configured to adjust an amount of light, an acquisition unit configured to acquire an amount of change in image magnification corresponding to information about a position of the focus lens and an aperture value of the diaphragm, and a lens control unit configured to transmit the amount of change in image magnification to the camera.

According to yet another aspect of the present invention, there is provided a camera on which an interchangeable lens is detachably mounted and which is capable of communicating with the interchangeable lens. The interchangeable lens includes a variator lens configured to change a focal length by moving in an optical axis direction, a focus lens configured to change a focusing state of an object image by moving in the optical axis direction, a diaphragm configured to adjust an amount of light, an acquisition unit configured to acquire an amount of change in image magnification corresponding to information about a position of the variator lens, a position of the focus lens, and an aperture value of the diaphragm, and a lens control unit configured to transmit the amount of change in image magnification to the camera. The camera includes a camera control unit configured to transmit, to the lens control unit, a drive command for the focus lens which is determined based on the amount of change in image magnification received from the lens control unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 illustrates a timing chart of a communication between a camera and a lens and operation thereof.

DESCRIPTION OF THE EMBODIMENTS

Various exemplary embodiments, features, and aspects of the invention will be described in detail below with reference to the drawings.

Figure 1:
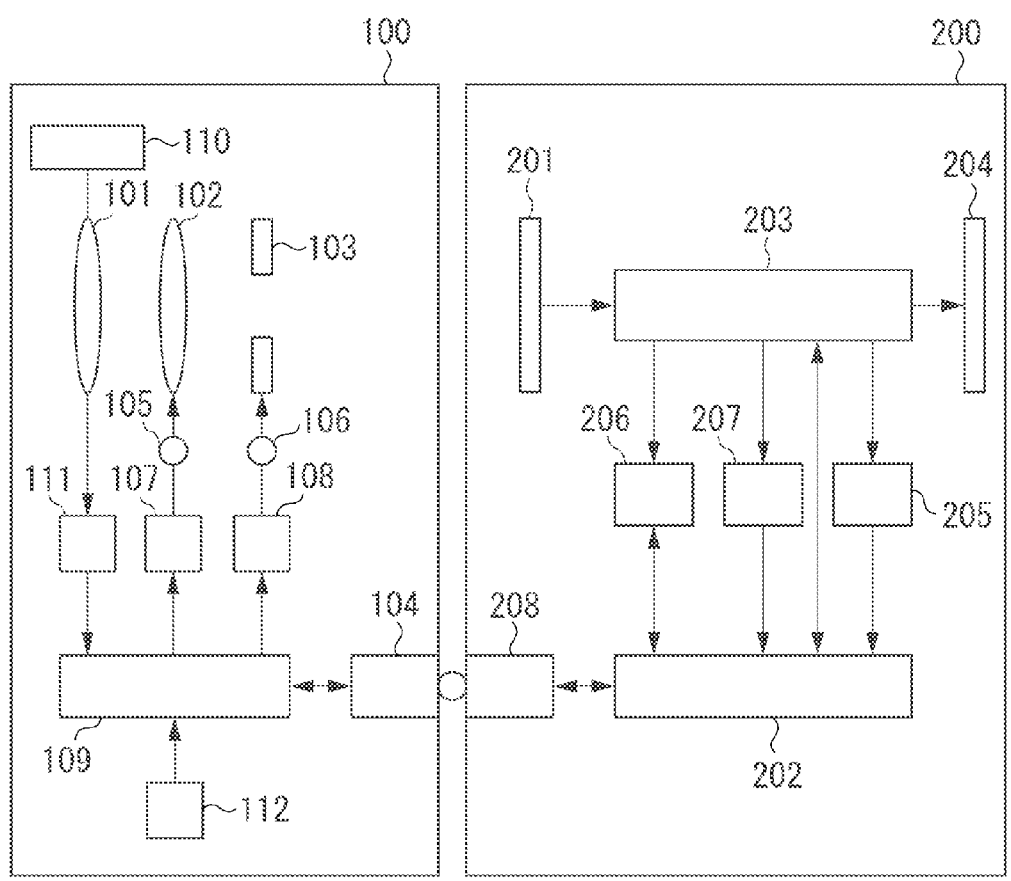
FIG. 1 is a block diagram illustrating a camera system according to an exemplary embodiment of the present invention.

FIG. 1 is a block diagram illustrating a camera system including an interchangeable lens and a camera body (a camera) according to an exemplary embodiment of the present invention.

A configuration of the camera system is described below with reference to FIG. 1. The camera system according to the exemplary embodiment of the present invention includes an interchangeable lens 100 and a camera body 200.

The interchangeable lens 100 is detachable from the camera body 200. Mount portions of the interchangeable lens 100 and the camera body 200 are coupled to each other to connect their respective power supply pins and communication pins with each other, enabling bidirectional communication.

The interchangeable lens 100 is composed of an optical member and a portion for controlling the optical member. The optical member includes a variator lens 101 which moves in an optical axis direction to change a focal length, a focus lens 102 which moves in the optical axis direction to change a focusing state of an object image, and a diaphragm 103 which adjusts the amount of light. These optical components appropriately adjust the amount of light incident on the camera body 200 to form an image on an image sensor 201 of the camera body 200.

The portion for controlling the optical member includes a lens communication unit 104 which communicates with a camera microcomputer 202 and actuators, such as a focus motor 105 for moving the focus lens 102 and a diaphragm motor 106 for driving the diaphragm 103. A stepping motor may be used for the focus motor 105 and the diaphragm motor 106.

If the stepping motor is used, the amount of pulses driven after a reset operation is counted to detect a position of an object. For other actuators, a position detection unit is separately provided to detect a focus lens position and a diaphragm position.

Furthermore, there are provided a focus driver 107 for driving the focus motor 105 and a diaphragm driver 108 for driving the diaphragm motor 106. A lens microcomputer 109 controls the focus driver 107 and the diaphragm driver 108 to appropriately control the optical members.

A zoom operation unit 110 operates the variator lens 101 to change a focal length. The zoom operation unit 110 and the variator lens 101 operate together via a mechanical member such as a zoom ring, for example, to adjust the position of the variator lens 101. There are provided a zoom position detection unit 111 including a potentiometer for detecting the position of the variator lens 101, and an analog-to-digital (AD) converter in the lens microcomputer 109 which converts the position of the variator lens 101 into an electric signal to detect the position of the variator lens 101 as a digital signal. Previously storing corresponding data between the position of the variator lens 101 and the focal length allows the lens microcomputer 109 to refer to results output from the zoom position detection unit 111 to obtain the focal length.

Previously storing corresponding data between the position of the focus lens and an object distance allows the lens microcomputer 109 to obtain the object distance from the position of the focus lens.

Similarly, previously storing corresponding data between a diaphragm position and an F-number (an aperture value) allows the lens microcomputer 109 to obtain the F-number from the diaphragm position.

A memory 112 as a storage unit stores data corresponding to the amount of change in image magnification in a case where the focus lens 102 is moved by a prescribed amount in positions of the variator and the focus lens. In other words, the memory 112 stores information corresponding to the amount of change in image magnification in a case where the focus lens 102 is moved by a predetermined amount when the variator lens 101 and the focus lens 102 lie in their respective predetermined positions. The prescribed amount may be taken as an amount of movement of the focus lens 102 in changing a prescribed amount of defocus (F=1, value Δ=prescribed amount), for example. If the value Δ is taken with a circle-of-confusion diameter of an optical system of the interchangeable lens as a reference, the value Δ may be similarly standardized even if the optical system of the interchangeable lens is changed.

As described above, the position of the variator lens corresponds to the focal length and the position of the focus lens also corresponds to the object distance. For this reason, instead of the position of the variator lens and the position of the focus lens, data may correspond to the amount of change in image magnification, which corresponds to the focal length and the object distance.

The camera body 200 includes an image sensor 201, which forms an image of light passing through the interchangeable lens 100 and converts the image into an electric signal. A video signal, which is converted into the electric signal by the image sensor 201, is sent to a video processing unit 203 to be subjected to video processing, such as luminance adjustment, a change in video size, white balance adjustment, and color adjustment for producing an appropriate image. The video information subjected to an appropriate video processing by the video processing unit 203 is sent to a display device 204, such as a liquid crystal panel, as an output unit and a recording unit 205 formed of a semiconductor storage device, a hard disk and a magnetic tape, and displayed on the display device 204 and stored in the recording unit 205. The video data subjected to the video processing by the video processing unit 203 is sent to an AF unit 206 and an automatic exposure (AE) unit 207.

The AF unit 206 extracts data on contrast from the video information to generate information about a focus evaluation value to determine to what extent the data are in focus, generating information for drive control of the focus lens 102 of the interchangeable lens 100. The AE unit 207 extracts information about luminance from the video information to generate information about AE evaluation to determine whether exposure exceeds or not, generating information for controlling the diaphragm 103 of the interchangeable lens 100. The camera microcomputer 202 for controlling the units inside the camera body 200 communicates with the lens communication unit 104 of the interchangeable lens 100 via a camera communication unit 208. The camera body 200 receives information inside the interchangeable lens 100, such as information about a current focus lens position, a variator lens position, and a diaphragm, for example. The camera body 200 transmits information for controlling each lens to the interchangeable lens 100 via the camera communication unit 208 based on the above information and the information of the AF unit 206, the AE unit 207, and the video processing unit 203. The interchangeable lens 100 controls each lens based on the received information.

Communication between the interchangeable lens 100 and the camera body 200 and timing of various operations are described below with reference to FIG. 2.

FIG. 2 illustrates a schematic operation diagram with various operations arranged in the ordinate and time elapse in the abscissa.

In FIG. 2, LTC (lens to camera) indicates communication from the interchangeable lens 100 to the camera body 200. A "High" period of the LTC indicates a period for which the interchangeable lens 100 transmits data to the camera body 200. Similarly, CTL (camera to lens) indicates communication from the camera body 200 to the interchangeable lens 100. A "High" period of the CTL indicates a period for which the camera body 200 transmits data to the interchangeable lens 100. The LTC and the CTL communication are performed in a first period.

In FIG. 2, generation of AF drive command indicates a timing at which the AF drive command for the interchangeable lens 100 is generated in the camera body 200, and the generation period of the AF drive command is expressed by a square. Similarly, an AF drive command indicates processing for actually driving the focus lens in the interchangeable lens 100 based on the AF drive command received from the camera body 200, and a period for which the focus lens is driven is expressed by a square. The processing for driving the focus lens refers to preparations for driving the focus lens by transmitting a target position and a driving speed of the focus lens to the focus driver 107. The communication of the AF drive command is performed in a second period. The second period is longer than the first period and twice as long as the first period, for example.

In FIG. 2, calculation of image magnification indicates a period, for which the amount of change in image magnification is calculated, and is expressed by a square.

In FIG. 2, a focus lens position schematically indicates how the focus lens position is changed by the drive command of the focus lens specified by the AF drive command. The ordinate indicates the position of the focus lens.

Communication between the interchangeable lens 100 and the camera body 200 is periodically performed according to storage time of the image sensor.

A series of flows is described below. The interchangeable lens 100 transmits the focus lens position and the amount of change in image magnification to the camera body 200 by communication at a timing at which the LTC is "High" (<1> in FIG. 2). The camera body 200 calculates the AF evaluation value from the video data obtained by the image sensor 201.

The camera body 200 calculates a position, direction, amount, and speed in which the focus lens is moved based on the position of the focus lens 102 transmitted from the interchangeable lens 100 and the calculated AF evaluation value in the period for which the AF drive command is generated (<2> in FIG. 2). The camera body 200 transmits the calculated information (the position, direction, amount, and speed) as the AF drive command to the interchangeable lens 100 at a timing at which the CTL is "High" (<3> in FIG. 2).

The interchangeable lens 100 receives the information to perform processing for actually operating the focus lens 102 in a period of the AF drive command (<4> in FIG. 2). The interchangeable lens 100 calculates a position (an expected position) that the focus lens 102 is expected to arrive at the next timing of "High" in the LTC before the next timing of "High" in the LTC (<5> in FIG. 2) comes. The zoom position detection unit 111 obtains the present position of the variator lens. The interchangeable lens 100 selects data corresponding to the present positions of the zoom and focus lenses from the data corresponding to the amount of change in image magnification previously stored in the memory 112. The interchangeable lens 100 obtains the amount of change in image magnification corresponding to the present F-number of the interchangeable lens 100 using the selected data and the present F-number. The amount of change in image magnification corresponding to the F-number may be obtained by simply multiplying the data corresponding to the present positions of the zoom and focus lenses by the present F-number, or further multiplying any coefficient thereby. As described above, the F-number corresponds to the position of the diaphragm. For this reason, the position of a diaphragm may be used instead of the F-number. The interchangeable lens 100 transmits information about the calculated expected position and the amount of change in image magnification of the focus lens 102 to the camera body 200 at the next timing of "High" in the LTC (<5> in FIG. 2).

Such a series of operations is repeated to periodically (in a V period, for example) notify the camera body 200 of information about the amount of change in image magnification according to the present status of the interchangeable lens 100 in a case where the focus lens is moved by a predetermined amount.

If the amount of change in image magnification calculated in a period <6> in FIG. 2, for example, exceeds a predetermined magnitude, a change in angle of view caused by wobbling operation seems to be inevitably increased. For that reason, in this case, at a timing of t1 in FIG. 2, the camera body 200 changes wobbling AF for wobbling the focus lens 102 to non-wobbling AF not for wobbling the focus lens 102. This allows an appropriate focus control with a little change in angle of view. As long as an AF system is used in which the focus lens is focused on an object without being wobbled, an AF system which searches the peak value of contrast while moving the focus lens in an optical axis direction, or a phase-difference AF system may be used as the non-wobbling AF.

Figure 3A:
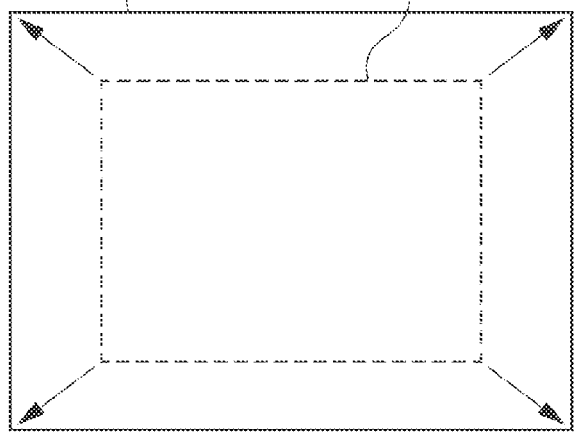
FIGS. 3A and 3B illustrate the influence of a change in image magnification on screens.
Figure 3B:
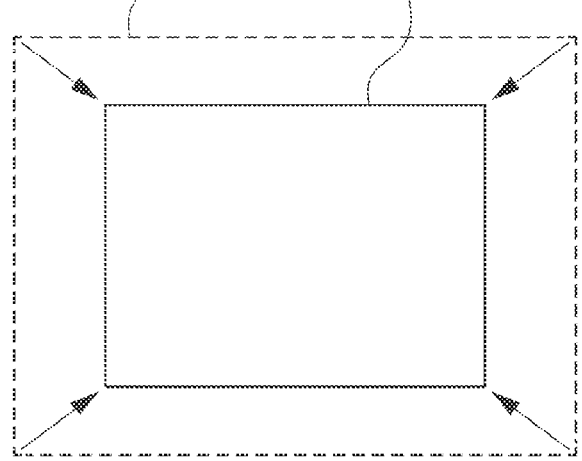

A change in image magnification is described below. In general, the "change in image magnification" refers to a change in an image caused when the optical system of a lens is changed. The rate of a change in angle of view in moving a variator lens, for example, in an optical axis direction is taken as the amount of change in image magnification. If the variator lens is moved to the "Wide-angle side," for example, the angle of view is more enlarged than the angle of view before the movement of the variator lens as illustrated in FIG. 3A. If the variator lens is moved to the "Telephoto side," the angle of view is more reduced than the angle of view before the movement of the variator lens as illustrated in FIG. 3B. Thus, the amount of change in image magnification expresses to what extent the angle of view is changed before and after the optical system is changed. The amount of change in image magnification may be the rate of a change in the whole screen or the rate of a change in a diagonal direction. The reference may be defined by the rate of a change in an image if definition is the same.

The correspondence of the amount of change in image magnification to various optical systems is described below with reference to FIGS. 4A, 4B, and 4C.

Figure 4A:
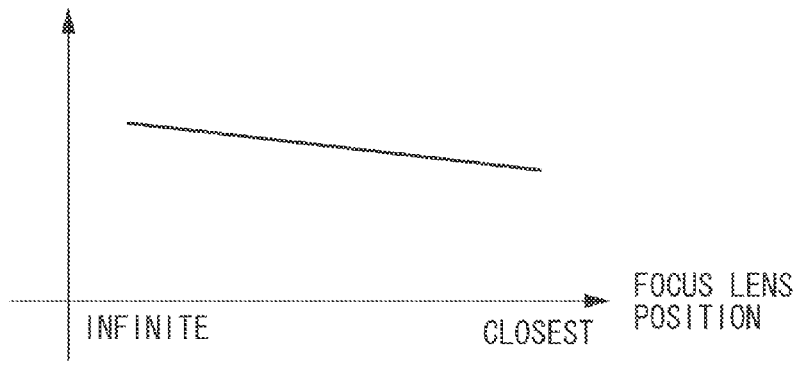
FIGS. 4A, 4B, and 4C illustrate a relationship of the amount of change in image magnification to a focus lens position, a variator lens position, and F-number.

FIG. 4A illustrates the amount of change in image magnification as a function of a focus lens position with the focus lens position as the abscissa and with the amount of change in image magnification as the ordinate. It is assumed that the variator lens position and the diaphragm position are fixed. As illustrated in FIG. 4A, the amount of change in image magnification is decreased as the focus lens is moved so that an object distance is changed from the infinite side to the closest side.

Figure 4B:
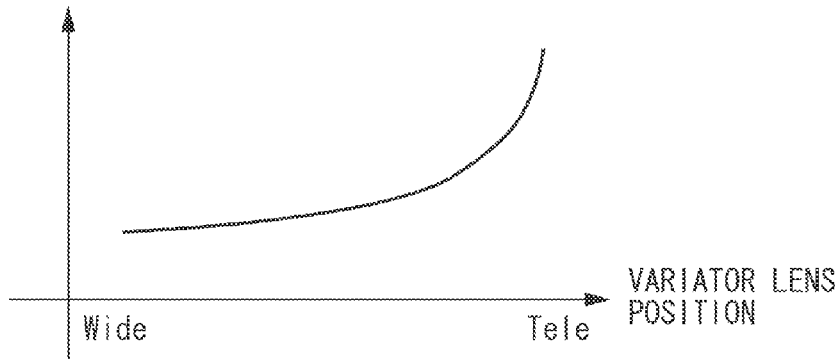

FIG. 4B illustrates the amount of change in image magnification as a function of the variator lens position with the variator lens position as the abscissa and with the amount of change in image magnification as the ordinate. It is assumed that the focus lens position and the diaphragm position are fixed. As illustrated in FIG. 4B, the amount of change in image magnification is increased as the variator lens is moved so that a focal length is changed from the wide-angle to telephoto sides.

Figure 4C:
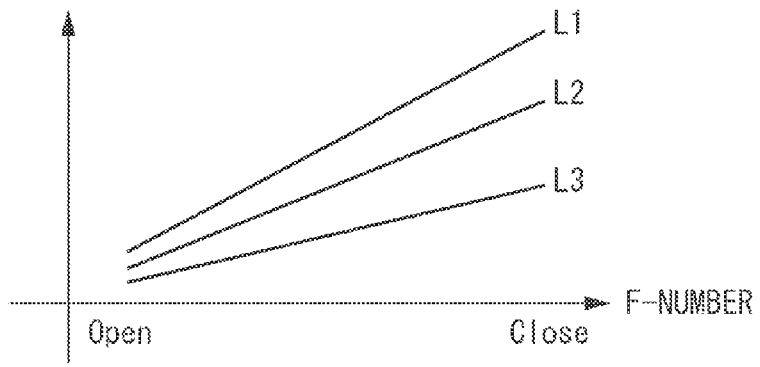

FIG. 4C illustrates the amount of change in image magnification as a function of the F-number with the F-number as the abscissa and with the amount of change in image magnification as the ordinate. The variator lens position is fixed and object distances are differentiated between L1, L2, and L3 (L1<L2<L3). As illustrated in FIG. 4C, the amount of change in image magnification is increased as the diaphragm is reduced from the "Open" to "Close" sides (to increase the F-number). Furthermore, the amount of change in image magnification is sharply changed as the object distance is decreased.

Thus, the amount of change in image magnification is changed as the variator lens position, the focus lens position, or the F-number is changed.

For this reason, the interchangeable lens 100 transmits to the camera body 200 the amount of change in image magnification per the F-number Δ in which data of the amount of change in image magnification per a circle-of-confusion diameter value Δ corresponding to the present positions of the zoom and focus lenses is multiplied by the present effective F-number.

The camera body 200 calculates the amount of wobbling amplitude at the time of the focus lens 102 performing wobbling operation. If the calculated amount of wobbling amplitude is 1/4 F-number Δ, for example, the camera body 200 calculates the amount of change in image magnification corresponding to the 1/4 F-number Δ. If the amount of change in image magnification is greater than the predetermined value, as described above, the AF drive method is changed and the amount of wobbling amplitude is decreased to decrease a change in angle of view.

Figure 5:
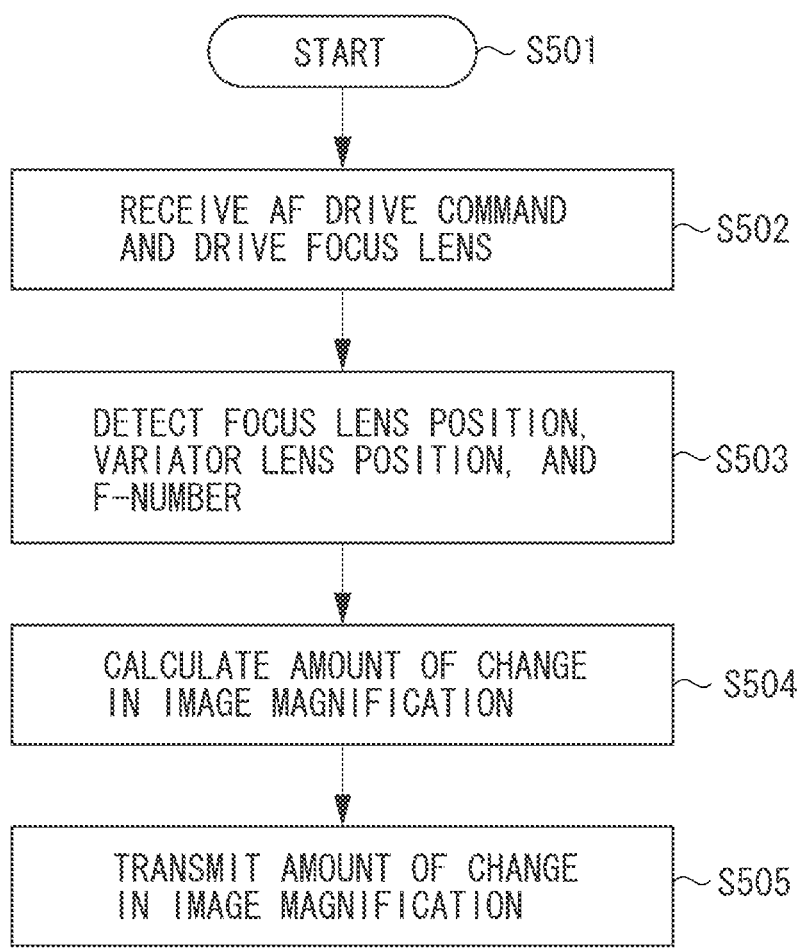
FIG. 5 is a flow chart illustrating a flow performed in an interchangeable lens.
Figure 6:
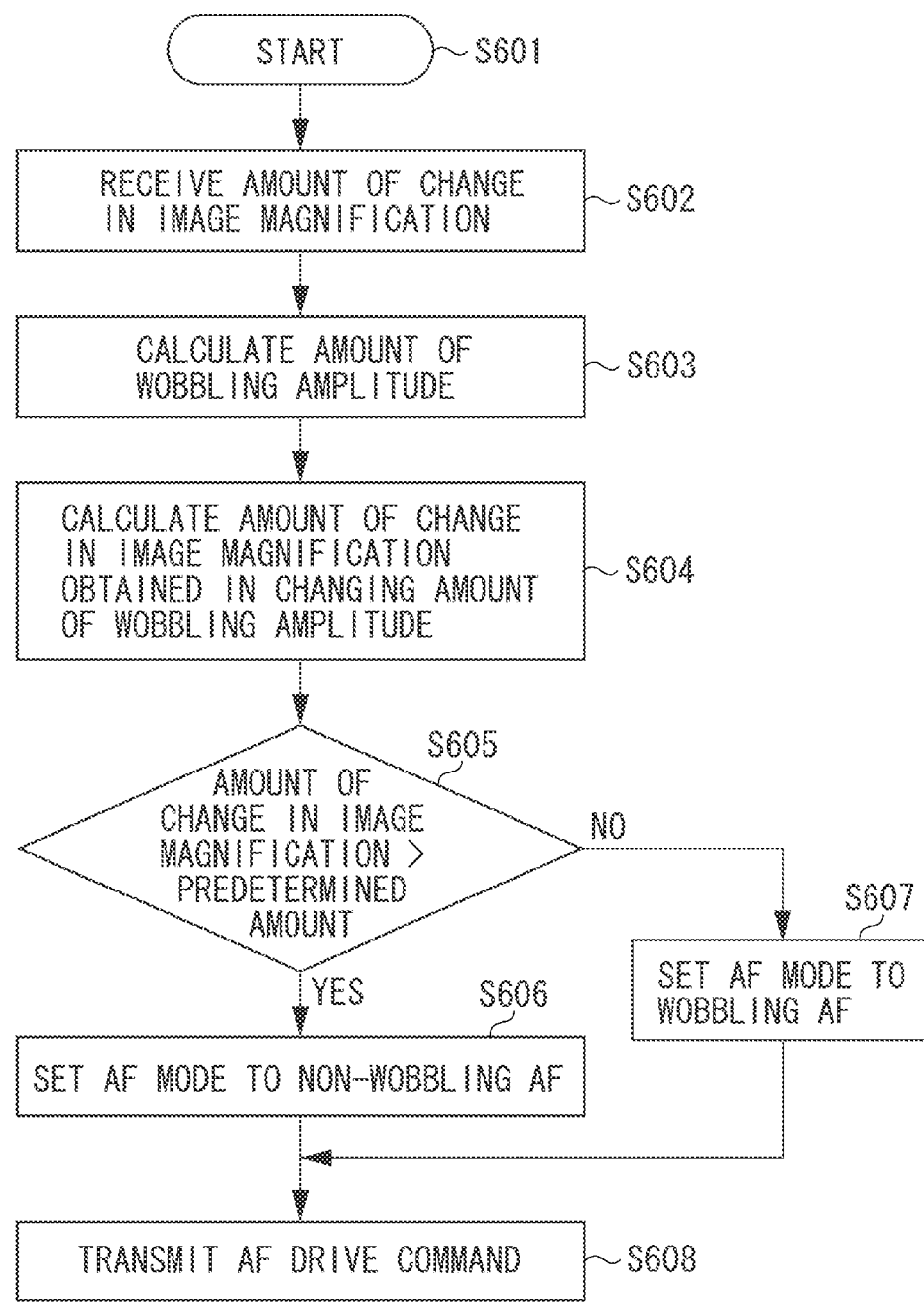
FIG. 6 is a flow chart illustrating a flow performed in a camera body.

An operational flow of the interchangeable lens 100 and the camera body 200 is described below with reference to flow charts in FIGS. 5 and 6. The flow chart in FIG. 5 illustrates the operation of the interchangeable lens 100. The flow chart in FIG. 6 illustrates the operation of the camera body 200.

The operation of the interchangeable lens 100 is described below with reference to FIG. 5. In step S501, the interchangeable lens 100 starts operation. In step S502, the interchangeable lens 100 receives the AF drive command from the camera body 200 to control the focus lens. The interchangeable lens 100 drives the focus lens based on the AF drive command. In step S503, the interchangeable lens 100 detects and calculates various states of optical members in the interchangeable lens 100. The various states refer to the variator lens position, the focus lens position, and the F-number. In step S504, the interchangeable lens 100 calculates the amount of change in image magnification based on the various states. In step S505, the interchangeable lens 100 transmits the calculated amount of change in image magnification to the camera body 200. This enables the interchangeable lens 100 to transmit to the camera body 200 the amount of change in image magnification in the present state.

The operation of the camera body 200 is described below with reference to FIG. 6. In step S601, the camera body 200 starts operation. In step S602, the camera body 200 receives the amount of change in image magnification in the present state of the interchangeable lens 100 from the interchangeable lens 100. In step S603, the camera body 200 calculates the amount of wobbling amplitude. In step S604, the camera body 200 calculates the amount of change in image magnification obtained in changing the amount of wobbling amplitude using the amount of wobbling amplitude calculated in step S603 and the amount of change in image magnification obtained in step S602. In step S605, the camera body 200 determines whether the amount of change in image magnification calculated in step S604 is greater than a predetermined value. If the amount is greater than the predetermined value (YES in step S605), the camera body 200 determines that the angle of view is significantly affected, and the processing proceeds to step S606. In step S606, the camera body 200 sets an AF mode to the non-wobbling AF. If the amount is smaller than the predetermined value (NO in step S605), the processing proceeds to step S607. In step S607, the camera body 200 sets the AF mode to the wobbling AF. In step S608, the camera body 200 transmits the AF drive command to the interchangeable lens 100 in the AF set in step S606 or step S607. Thus, the camera body 200 determines the AF operation system according to the amount of change in image magnification.

Thus, the periodical transmission, to the camera body 200, of information about the amount of change in image magnification according to the focus and variator lens positions in the interchangeable lens 100 allows the AF drive, in which a change in angle of view is less affected. The interchangeable lens 100 transmits not all the information about the amount of change in image magnification at the time of an initial communication but only the required information about the amount of change in image magnification when needed. This allows reduction in the time required for the initial communication. Since both of the interchangeable lens 100 and the camera body 200 do not need to have the same data, the memory capacity required of the camera body 200 can be reduced.

In the above exemplary embodiment, the interchangeable variator lens is described, however, the present exemplary embodiment may be applied to an interchangeable lens with a fixed focal length (fixed focal length lens). In this case, there is no variator lens, so that there only has to be data corresponding to the amount of change in image magnification in changing the prescribed amount of movement of the focus lens at the focus lens position.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-111886 filed May 15, 2012, which is hereby incorporated by reference herein in its entirety.

What is claimed is:

1. An interchangeable lens detachable from a camera, the interchangeable lens comprising:
    a variator lens configured to change a focal length by moving in an optical axis direction;
    a focus lens configured to change a focusing state of an object image by moving in the optical axis direction;
    a diaphragm configured to adjust an amount of light;
    an acquisition unit configured to acquire an amount of change in image magnification corresponding to information about a position of the variator lens, a position of the focus lens, and an aperture value of the diaphragm; and
    a lens control unit configured to transmit the amount of change in image magnification to the camera.

2. The interchangeable lens according to claim 1, further comprising a storage unit configured to store information corresponding to the amount of change in image magnification in moving the focus lens by a predetermined amount when the variator and focus lenses lie in respective predetermined positions,
    wherein the acquisition unit acquires the amount of change in image magnification based on information corresponding to the amount of change in image magnification stored in the storage unit and information about the aperture value of the diaphragm.

3. The interchangeable lens according to claim 2, wherein the information corresponding to the amount of change in image magnification stored in the storage unit includes the one that takes a circle-of-confusion diameter of an optical system of the interchangeable lens as a reference.

4. The interchangeable lens according to claim 1, wherein the lens control unit transmits the amount of change in image magnification at a first period to the camera.

5. The interchangeable lens according to claim 4, wherein the camera includes a camera control unit configured to transmit, to the lens control unit at a second period, a drive command for the focus lens which is determined based on the amount of change in image magnification transmitted from the lens control unit at the first period,
    wherein the lens control unit receives the drive command at the second period, and
    wherein the second period is longer than the first period.

6. A single-focus interchangeable lens detachable from a camera, the interchangeable lens comprising:
a focus lens configured to change a focusing state of an object image by moving in an optical axis direction;
a diaphragm configured to adjust an amount of light;
an acquisition unit configured to acquire an amount of change in image magnification corresponding to information about a position of the focus lens and an aperture value of the diaphragm; and
a lens control unit configured to transmit the amount of change in image magnification to the camera.

7. The interchangeable lens according to claim 6, further comprising a storage unit configured to store information corresponding to the amount of change in image magnification in moving the focus lens by a predetermined amount in a predetermined position,
wherein the acquisition unit acquires the amount of change in image magnification based on information corresponding to the amount of change in image magnification stored in the storage unit and the information about the aperture value of the diaphragm.

8. The interchangeable lens according to claim 7, wherein the information corresponding to the amount of change in image magnification stored in the storage unit includes the one that takes a circle-of-confusion diameter of an optical system of the interchangeable lens as a reference.

9. The interchangeable lens according to claim 6, wherein the lens control unit transmits the amount of change in image magnification at a first period to the camera.

10. The interchangeable lens according to claim 9, wherein the camera includes a camera control unit configured to transmit, to the lens control unit at a second period, a drive command for the focus lens which is determined based on the amount of change in image magnification transmitted from the lens control unit at the first period,
wherein the lens control unit receives the drive command at the second period, and
wherein the second period is longer than the first period.

11. A camera on which an interchangeable lens is detachably mounted and which is capable of communicating with the interchangeable lens,
wherein the interchangeable lens includes:
a variator lens configured to change a focal length by moving in an optical axis direction;
a focus lens configured to change a focusing state of an object image by moving in the optical axis direction;
a diaphragm configured to adjust an amount of light;
an acquisition unit configured to acquire an amount of change in image magnification corresponding to information about a position of the variator lens, a position of the focus lens, and an aperture value of the diaphragm; and
a lens control unit configured to transmit the amount of change in image magnification to the camera, and
wherein the camera comprises:
a camera control unit configured to transmit, to the lens control unit, a drive command for the focus lens which is determined based on the amount of change in image magnification received from the lens control unit.

12. The camera according to claim 11, wherein the camera control unit receives the amount of change in image magnification transmitted from the lens control unit at a first period, and transmits the drive command for the focus lens to the lens control unit at a second period.

13. The camera according to claim 12, wherein the second period is longer than first period.

14. A method for controlling an interchangeable lens including a variator lens configured to change a focal length by moving in an optical axis direction, a focus lens configured to change a focusing state of an object image by moving in the optical axis direction, and a diaphragm configured to adjust an amount of light, the interchangeable lens being detachably mounted on a camera and capable of communicating with the camera, the method comprising:
acquiring an amount of change in image magnification corresponding to information about a position of the variator lens, a position of the focus lens, and an aperture value of the diaphragm; and
transmitting the amount of change in image magnification to the camera.

15. A method for controlling a single-focus interchangeable lens including a focus lens configured to change a focusing state of an object image by moving in an optical axis direction, and a diaphragm configured to adjust an amount of light, the interchangeable lens being detachably mounted on a camera and capable of communicating with the camera, the method comprising:
acquiring an amount of change in image magnification corresponding to information about a position of the focus lens and an aperture value of the diaphragm; and
transmitting the amount of change in image magnification to the camera.

16. A method for controlling a camera, on which an interchangeable lens is detachably mounted and which is capable of communicating with the interchangeable lens, the interchangeable lens including a variator lens configured to change a focal length by moving in an optical axis direction, a focus lens configured to change a focusing state of an object image by moving in the optical axis direction, and a diaphragm configured to adjust an amount of light, the method comprising:
transmitting, after receiving an amount of change in image magnification corresponding to information about a position of the variator lens, a position of the focus lens, and an aperture value of the diaphragm from the interchangeable lens, a drive command for the focus lens which is determined based on the amount of change in image magnification to the interchangeable lens.

17. A camera system comprising:
an interchangeable lens and a camera,
wherein the interchangeable lens is detachable from the camera and includes:
a variator lens configured to change a focal length by moving in an optical axis direction;
a focus lens configured to change a focusing state of an object image by moving in the optical axis direction;
a diaphragm configured to adjust an amount of light;
an acquisition unit configured to acquire an amount of change in image magnification corresponding to information about a position of the variator lens, a position of the focus lens, and an aperture value of the diaphragm; and
a lens control unit configured to transmit the amount of change in image magnification to the camera, and
wherein the camera is configured to transmit, to the lens control unit, a drive command for the focus lens which is determined based on the amount of change in image magnification received from the lens control unit.

18. A camera system comprising:
a single-focus interchangeable lens and a camera,
wherein the interchangeable lens is detachable from the camera and includes:

a focus lens configured to change a focusing state of an object image by moving in an optical axis direction;

a diaphragm configured to adjust an amount of light;

an acquisition unit configured to acquire an amount of change in image magnification corresponding to information about a position of the focus lens and an aperture value of the diaphragm; and a lens control unit configured to transmit the amount of change in image magnification to the camera, and wherein the camera is configured to transmit, to the lens control unit, a drive command for the focus lens which is determined based on the amount of change in image magnification received from the lens control unit.

* * * * *